(12) United States Patent
Cordeiro et al.

(10) Patent No.: US 8,804,644 B2
(45) Date of Patent: *Aug. 12, 2014

(54) METHOD, APPARATUS AND SYSTEM OF DYNAMIC BANDWIDTH MANAGEMENT

(75) Inventors: Carlos Cordeiro, Portland, OR (US); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/495,107

(22) Filed: Jun. 13, 2012

(65) Prior Publication Data

US 2012/0250672 A1 Oct. 4, 2012

Related U.S. Application Data

(63) Continuation of application No. 12/260,372, filed on Oct. 29, 2008, now Pat. No. 8,223,739.

(51) Int. Cl.
*H04W 4/00* (2009.01)
*H04W 74/06* (2009.01)
*H04W 72/12* (2009.01)
*H04W 84/18* (2009.01)
*H04W 72/04* (2009.01)

(52) U.S. Cl.
CPC ............. *H04W 74/06* (2013.01); *H04W 72/12* (2013.01); *H04W 84/18* (2013.01); *H04W 72/0413* (2013.01); *H04W 72/0453* (2013.01)
USPC ........................................................ 370/329

(58) Field of Classification Search
None
See application file for complete search history.

(56) References Cited

U.S. PATENT DOCUMENTS

| | | | |
|---|---|---|---|
| 5,297,144 A * | 3/1994 | Gilbert et al. | ................. 370/346 |
| 6,233,466 B1 | 5/2001 | Wong et al. | |
| 6,745,038 B2 | 6/2004 | Callaway, Jr. et al. | |
| 6,823,186 B2 | 11/2004 | Salokannel et al. | |
| 6,973,335 B2 | 12/2005 | Ganton | |
| 7,006,530 B2 | 2/2006 | Spinar et al. | |
| 7,099,671 B2 | 8/2006 | Liang | |
| 7,110,380 B2 | 9/2006 | Shvodian | |
| 7,113,536 B2 | 9/2006 | Alriksson et al. | |
| 7,146,164 B2 | 12/2006 | Hunzinger | |

(Continued)

FOREIGN PATENT DOCUMENTS

| | | |
|---|---|---|
| CN | 101030883 A2 | 9/2007 |
| JP | 2000-332667 A | 11/2000 |

(Continued)

OTHER PUBLICATIONS

Search Report for European Patent Application No. 09825208.3 mailed on Mar. 4, 2013, 12 pages.

(Continued)

*Primary Examiner* — Yong Zhou
(74) *Attorney, Agent, or Firm* — John F. Travis

(57) ABSTRACT

A wireless communication device, a wireless communication system and a method of transmitting by a piconet controller (PNC) a poll request frame using beamforming techniques to one or more devices, wherein the poll request frame includes a time offset for sending a poll response frame by the device. The PNC receives the poll response frame with a channel bandwidth allocation request and dynamically allocating a channel bandwidth to the one or more devices according to the channel bandwidth allocation request.

6 Claims, 6 Drawing Sheets

(56) References Cited

U.S. PATENT DOCUMENTS

| | | | |
|---|---|---|---|
| 7,245,947 B2 | 7/2007 | Salokannel et al. | |
| 7,280,517 B2 | 10/2007 | Benveniste | |
| 7,415,279 B2 | 8/2008 | Liang | |
| 7,433,697 B2 | 10/2008 | Karaoguz et al. | |
| 7,453,832 B2 | 11/2008 | Steer et al. | |
| 7,460,834 B2 | 12/2008 | Johnson et al. | |
| 7,463,886 B2 | 12/2008 | Salokannel et al. | |
| 7,548,552 B2 | 6/2009 | Shvodian et al. | |
| 7,672,382 B2 | 3/2010 | Yoshida et al. | |
| 7,809,835 B2 | 10/2010 | Reunamäki et al. | |
| 7,822,000 B2 | 10/2010 | Sekhar | |
| 7,890,116 B2 | 2/2011 | Salokannel et al. | |
| 8,223,739 B2 | 7/2012 | Cordeiro et al. | |
| 8,335,203 B2 | 12/2012 | Trainin et al. | |
| 2002/0080816 A1* | 6/2002 | Spinar et al. | 370/449 |
| 2003/0108059 A1 | 6/2003 | Yew et al. | |
| 2004/0002357 A1 | 1/2004 | Benveniste | |
| 2004/0037258 A1 | 2/2004 | Scherzer et al. | |
| 2004/0196822 A1 | 10/2004 | Proctor, Jr. | |
| 2005/0002362 A1 | 1/2005 | Kim et al. | |
| 2005/0002372 A1 | 1/2005 | Rune et al. | |
| 2005/0075142 A1 | 4/2005 | Hoffmann et al. | |
| 2005/0135409 A1* | 6/2005 | Janczak | 370/449 |
| 2005/0135410 A1 | 6/2005 | Stephens | |
| 2005/0152291 A1 | 7/2005 | Al-Harthi | |
| 2005/0213503 A1 | 9/2005 | Guo et al. | |
| 2005/0285719 A1 | 12/2005 | Stephens | |
| 2006/0087423 A1 | 4/2006 | Coronel et al. | |
| 2006/0159118 A1 | 7/2006 | Shvodian et al. | |
| 2006/0164969 A1 | 7/2006 | Malik et al. | |
| 2006/0215601 A1 | 9/2006 | Vleugels et al. | |
| 2007/0002809 A1 | 1/2007 | Reunamaki et al. | |
| 2007/0060160 A1 | 3/2007 | Hur et al. | |
| 2007/0086417 A1 | 4/2007 | Jang et al. | |
| 2007/0147332 A1* | 6/2007 | Lappetelainen et al. | 370/346 |
| 2007/0253391 A1 | 11/2007 | Shao et al. | |
| 2007/0286140 A1 | 12/2007 | Kwon | |
| 2008/0233875 A1 | 9/2008 | Desai et al. | |
| 2008/0291873 A1 | 11/2008 | Benveniste | |
| 2009/0046653 A1 | 2/2009 | Singh et al. | |
| 2009/0253438 A1 | 10/2009 | Chater-Lea et al. | |
| 2012/0127972 A1 | 5/2012 | Trainin et al. | |

FOREIGN PATENT DOCUMENTS

| | | |
|---|---|---|
| JP | 2004064340 | 2/2004 |
| JP | 2007-502079 A | 2/2007 |
| JP | 2007149076 | 6/2007 |
| TW | I269562 | 12/2006 |
| TW | I294734 | 3/2008 |
| WO | 2006069176 | 6/2006 |
| WO | 2007/033263 A1 | 3/2007 |
| WO | 2008/126958 A1 | 10/2008 |
| WO | 2009/114518 A2 | 9/2009 |
| WO | 2009/114518 A3 | 12/2009 |
| WO | 2010/053719 A2 | 5/2010 |
| WO | 2010/053719 A3 | 7/2010 |

OTHER PUBLICATIONS

Office Action for Chinese Patent Application No. 200910253080.0 mailed on Apr. 2, 2013, p pages (including 5 pages of English translation).

N/A: "Merged Proposal New Phy Layer and Enhancement Mac Mmwave System Proposal ; 15-07-0934-00-003c-merged-proposal-new-phy-layer-and-enhancement-mac-mmwave-system-p roposal", IEEE Draft; 15-07-0934-00-003C-Merged-Proposal-New-Phy-Layer-and-Enhancement-Mac-Mmwave-System-P roposal, IEEE-SA Mentor, Piscataway, NJ USA, vol. 802.153c, Nov. 14, 2007, pp. 1-89, XP017668582, [retrieved on Nov. 14, 2007].

Cordeiro C: "Evaluation of Medium Access Technologies for Next Generation Millimeter-Wave WLAN and WPAN", Communications Workshops, 2009. ICC Workshops 2009. IEEE International Conference on, IEEE, Piscataway, NJ, USA, Jun. 14, 2009, pp. 1-5, XP031515551, ISBN: 978-1-4244-3437-4.

Search Report for European Patent Application No. 12196822.6 mailed on Apr. 4, 2013, 10 pages.

Trainin, Solomon et al., "60 GHz WPAN MAC and PHY Features", , U.S. Appl. No. 61/035,480, filed Mar. 11, 2008, 204 pages.

International Search Report and Written Opinion Received for PCT Patent Application No. PCT/US2009/036645, mailed on Oct. 22, 2009, 12 pages.

International Preliminary Report on Patentability Received for PCT Patent Application No. PCT/US2009/036645, mailed on Sep. 23, 2010, 6 pages.

Office Action from Chinese Patent application 200910149725.6, mailed Nov. 1, 2011; 23 pages of Office Action including 15 pages of English Translation.

International Search report and Written Opinion Received for PCT Patent Application No. PCT/US2009/061817, Mailed on Apr. 30, 2010,11 pages.

International Preliminary Report on Patentability Received for PCT Patent No. PCT/US2009/061817, Issued on May 3, 2011, 5 pages.

Office Action Received for Taiwan Patent Application No. 98107662, Mailed on Nov. 12, 2012. 8 pages.

Cordeiro, et al., TCWG-2008-07-Section 8.4.3A-INTEL-0063-00, Next Generation mmWave Specification, Jul. 23, 2008.

Office Action Received for Chinese Patent Application No. 200910253080.0, Mailed on Jul. 4, 2012, 34 pages of Office Action including 21 pages of English Translation.

Office Action Received for Chinese Patent Application No. 200910149725.6, Mailed on Jun. 13, 2012, 5 pages of Office Action including 2 pages of English Translation.

Office Action Received for , U.S. Appl. No. 12/260,372 Mailed on Jun. 28, 2011, 14 pages.

Office Action Received for U.S. Appl. No. 12/260,372 Mailed on Nov. 8, 2011, 13 pages.

Office Action from Japanese Patent application 2011-534642 mailed Jan. 8, 2013; 2 pages of Office Action and 2 pages of English Translation.

Office Action and Search Report for Taiwanese Patent Application No. 98136327, mailed on Jul. 26, 2013, 18 pages, including 8 pages of English translation.

Office Action for Japanese Patent Application No. 2011-534642, mailed Aug. 6, 2013, 4 pages, including 2 pages of English translation.

Office Action for Chinese Patent Application No. 200910253080.0, mailed on Oct. 30, 2013, 13 pages, including 8 pages of English translation.

Office Action Received for European Patent Application No. 09825208.3, Mailed on Feb. 10, 2014, 10 Pages.

Cordeiro et al., "C-MAC: A Cognitive MAC Protocol for Multi-Channel Wireless Networks", 2nd IEEE International Symposium on New Frontiers in Dynamic Spectrum Access Networks: [DYSPAN 2007] ; Dublin, Ireland, Apr. 17-20, 2007, pp. 147-157.

Cordeiro et al., Multicast Over Wireless Mobile Ad Hoc Networks: Present and Furute Directions, IEEE Network, vol. 17, No. 1, Jan. 1, 2003, pp. 2-9.

Office Action received from Japanese Patent application 2011-534642 mailed Feb. 12, 2014, 3 pages of Office Action and 4 pages of English Translation.

Office Action received from European Patent application 12196822.6 mailed Mar. 14, 2014, 5 pages of Office Action.

* cited by examiner

METHOD, APPARATUS AND SYSTEM OF DYNAMIC BANDWIDTH MANAGEMENT

CROSS-REFERENCE

This application is a continuation of U.S. patent application Ser. No. 12/260,372, filed Oct. 29, 2008 and entitled "Method and Apparatus of Dynamic Bandwidth Management", the entire disclosure of which is incorporated herein by reference.

BACKGROUND OF THE INVENTION

A personal wireless area network (WPAN) is a network used for communication among computing devices (for example, telephones and personal digital assistants) close to one person. The devices may or may not belong to the person in question. The reach of a WPAN may be a few meters. WPANs may be used for intrapersonal communication among the personal devices themselves, or for connecting via an uplink to a higher level network and the Internet. Personal area networks may be wired with computer buses such as a universal serial bus (USB) and FireWire.

The IEEE 802.15.3 Task Group 3c (TG3c) was formed in March 2005. TG3c is developing a millimeter-wave (mm-Wave) based alternative physical layer (PHY) for the existing 802.15.3 Wireless Personal Area Network (WPAN) Standard 802.15.3-2003. This mmWave WPAN may operate in a frequency band such as the 57-64 GHz unlicensed band defined by FCC 47 CFR 15.255. The millimeter-wave WPAN may allow high coexistence, in a close physical spacing, with all other microwave systems in the 802.15 family of WPANs. In addition, the millimeter-wave WPAN may allow a very high data rate of over 2 Gigabit per second (Gbps) for applications such as high speed internet access, streaming content download (e.g., video on demand, high-definition television (HDTV), home theater, etc.), real time streaming and wireless data bus for cable replacement. Optional data rates in excess of 3 Gbps may be provided.

In addition to the 802.15.3c Task Group, the IEEE 802.11 Working Group is also forming a Task Group to define a wireless local area network (WLAN) also operating in the millimeter-wave frequencies.

However, a mmWave communication link is significantly less robust than those at lower frequencies (e.g. 2.4 GHz and 5 GHz bands) due to both oxygen absorption and high attenuation through obstructions. In addition, the mmWave communication link may use directional antenna to increase the communication range, but the use of directional antenna makes a link very sensitive to mobility. For example, a slight change in the orientation of the device or the movement of a nearby object and/or person may disrupt the link.

In order to satisfy a link budget requirement, two forms of communication may be used. The first form is an Omni mode and the second form is a directional mode. In the Omni mode a low rate transmission (e.g., in the order of a few Megabit per second (Mbps)) and/or multiple directional transmissions (emulating an omni coverage) may be employed to compensate for the loss of antenna gain due to the (quasi) omni transmission. In the directional mode a high rate transmission (e.g., in the order of Gbps) may be used since the link employs directional antennas and hence may benefit from the higher antenna gain.

In the Directional mode various access schemes may be used. For example, a Carrier-Sense Multiple Access with Collision Avoidance (CSMA/CA) may be used at 60 GHz when high-data rate directional communication is desired and Time division Multiple Access (TDMA) access if desired. However, one of the deficiencies of TDMA is that it has very high scheduling latencies (e.g., at least one superframe worth of latency) which is unacceptable for applications requiring low latency such as Internet traffic and Wireless I/O. Furthermore, the TDMA access scheme in Directional mode may not allow a dynamical de-allocation and reallocation of a channel bandwidth. With regards to CSMA/CA, its performance at 60 GHz may not be desirable since it requires the use of low rate omni direction transmission. Thus there is a need for an access scheme that allows bandwidth to be de-allocated and reallocated dynamically based on traffic demands.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
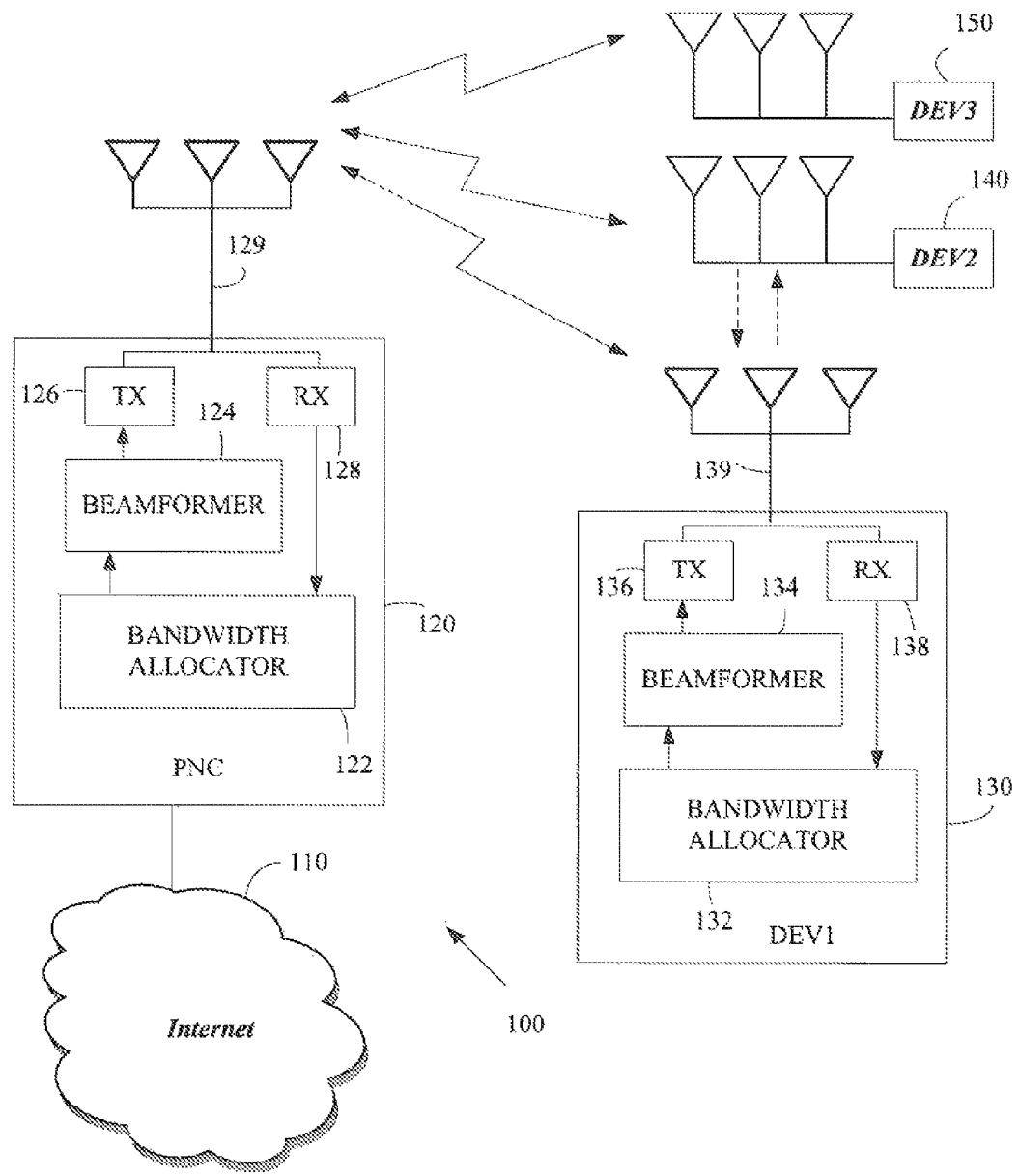
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, or transmission devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN).

Types of WPAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a schematic illustration of a wireless communication network 100, according to exemplary embodiments of the invention is shown. According to exemplary embodiments of the present invention, wireless communication network 100 may employ a WPAN. WPAN 100 may operate according to the standard developing by the IEEE 802.15.3 Task Group 3c (TG3c). TG3c has developed a millimeter-wave (mmWave) based alternative physical layer (PHY) for the existing 802.15.3 Wireless Personal Area Network (WPAN) Standard 802.15.3-2003.

According to some exemplary embodiment of the invention, WPAN 100 may include a network such as the Internet 110 operably coupled to a piconet coordinator (PNC) 120 and stations 130, 140 and 150. Stations 130, 140 and 150 are depicted as device 1 (DEV1), DEV2 and DEV3, respectively. Although the scope of the present invention is not limited in this respect, PNC 120 may be a notebook computer, a laptop computer or the like. Stations 130, 140 and 150 may include a camera, a mouse, an earphone, a speaker, a display, or a mobile personal device.

According to this exemplary embodiment of the invention, PNC 120 may include a bandwidth allocator 122, a beamformer 124, a transmitter 126, a receiver 128 and antennas 129. A device for example, DEV1 130 may include a bandwidth allocator 132, a beamformer 134, a transmitter 136, a receiver 138 and antennas 139.

Although the scope of the present invention is not limited in this respect, WPAN 100 may include a piconet which is one of possible topologies for the IEEE 802.15.3 WPAN. For example and according to one of the embodiments of the invention the piconet may include PNC 120 and several slave devices, for example DEVs 130, 140 and 150 within the transmission range of PNC 120. Any one of DEVs 130, 140 and 150 may include similar architecture as PNC 120 and may operate as a PNC, if desired.

Alternatively, in other embodiments of the present invention the wireless communication network may be a wireless local area network (WLAN). According to this example, the WLAN may include an access point (AP) and a plurality (e.g., two or more) stations within the transmission range of the AP. The AP in WLAN may be seen as the PNC 120 in the WPAN 100, while the stations in WLAN correspond to the DEVs 130, 140, and 150 in WPAN, although the scope of the present invention is not limited to this example.

According to at least one embodiment of the invention, the channel time in the piconet is based on the superframe, which may contain three major parts: the beacon, the Contention Access Period (CAP) and the Channel Time Allocation Period (CTAP). The PNC may provide a basic timing for the piconet by broadcasting beacon packets. Beacons may be used to set the timing allocation and management information for the piconet. Stations 130 and 140 may synchronize themselves with PNC 120 by receiving the beacons. The CAP may be used for asynchronous data or communication commands. For example, a medium access mechanism during the CAP may be Carrier Sense Multiple Access/Collision Avoidance (CSMA/CA). The CTAP includes the Channel Time Allocations (CTAs) and the management CTAs (MCTAs). The CTAs may be used for commands, isochronous streams, and asynchronous data and the medium access is based on TDMA. Collision-free transmissions are guaranteed in CTAs.

According to exemplary embodiment of the invention, PNC 120 may poll DEVs 130, 140 and 150. According to one example, PNC 120 may transmit a poll request frame using beamforming techniques to DEVs 130, 140 and 150. According to this example, beamformer 124 may generate an antenna beam directed to a polled DEV (e.g., DEV1 130) and transmitter 126 with antennas 129 may transmit the poll request frame to the device. For example, the poll request frame may include a time offset for sending a poll response frame. Stations 130 and/or 140 in their allocated time slot may transmit the response frame with a channel bandwidth allocation request. Receiver 128 of PNC 120 may receive a poll response frame from DEV1 130, a poll response frame from DEV2 140 and a poll response frame from DEV3 150. Bandwidth allocator 122 may dynamically allocate a required channel bandwidth to each DEV based on the channel bandwidth allocation request by transmitting a grant frame. After the allocation of the requested bandwidth DEV1 130 and/or DEV2 140 and/or DEV3 150 may communicate with each other (shown with dotted lines), although the scope of the present invention is not limited to this respect.

According to some embodiment of the invention, DEV1 130 may perform as a transmitter and may require more bandwidth and DEV2 140 may perform as a receiver and may need less or no allocation of bandwidth. PNC 120 may dynamically change the bandwidth allocation according to DEV1 130 and DEV2 140 requirements, although the scope of the present invention is not limited to this example.

According to exemplary embodiments of the invention PNC 120, DEV1 130, DEV2 140 and DEV3 150 may have similar architecture as illustrated in FIG. 1. It should be understood by those skilled in the art that in some embodiments of the invention beamformer 124 or 134, bandwidth allocator 122 or 132, may be implemented by hardware and/or by software and/or within a processor, if desired.

Figure 2:
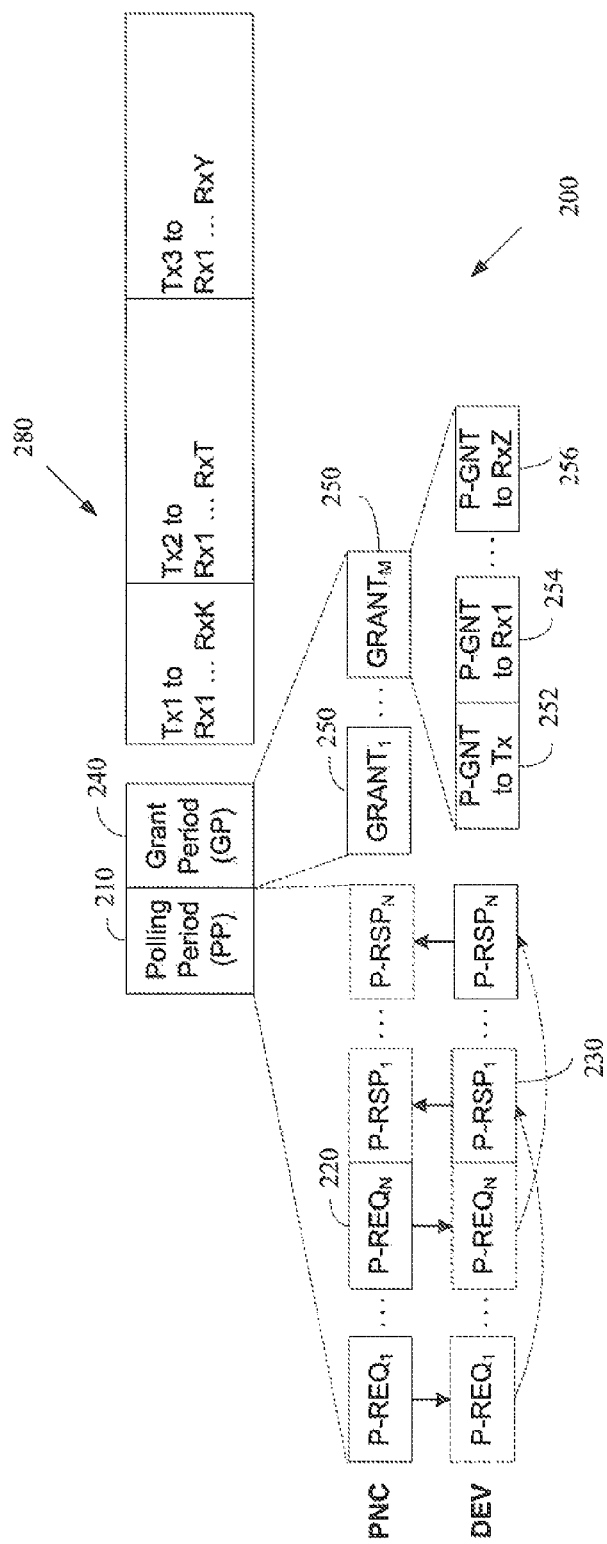
FIG. 2 is an illustration of a directional polling scheme of a wireless personal network according to some exemplary embodiment of the invention.

Turning to FIG. 2 an illustration of a directional polling scheme of a wireless personal network (WPAN) and/or wireless local area network (WLAN) according to some exemplary embodiment of the invention is shown. According to this example, WPAN and/or WLAN may include a central coordinator often termed as the PNC (piconet controller) and/or AP (Access Point). The PNC (e.g., PCN 120) may coordinate medium access by DEVs (e.g., DEV1 130, DEC2 140 and DEV3 150), using a directional polling scheme 200.

According to some exemplary embodiment of the invention polling scheme 200 may include a Polling Period (PP)

210, a Grant Period (GP) 240 and may or may not have dynamic bandwidth allocations (BWA) used for data transmission. The transmissions may take place in the directional mode using beamforming techniques. For example, A DEV (e.g., DEV1 130) that participates in the polling exchange may stay in active mode with antennas beamformed towards the PNC (e.g., PCN 120), if desired.

During the PP 210 time period, the PNC may poll a subset of its associated DEVs (e.g., DEVs 130, 140 and 150). This is done through the transmission of a Poll Request (P-REQ) frame 220 from the PNC to the intended DEV. In another embodiment of the invention, the wireless communication network may be the WLAN. In this embodiment, the P-REQ frame may be a modified QoS-Poll frame used in the IEEE 802.11 standard, if desired. Upon receiving a P-REQ frame (shown as a dotted box), a polled DEV may respond to the PNC with a Poll Response (P-RSP) frame 230 in its scheduled response slot. P-REQ frame 220 from the PNC to DEV may include a time offset that the polled DEV may use to send back its P-RSP frame 230. Having the feedback P-RSP frames (shown as dotted boxes) from the DEVs being scheduled may increase the efficiency of the polling scheme since it minimizes the need for turnaround times in between frames.

According to some embodiments of the invention, both P-REQ 220 and P-RSP 230 frames may carry bandwidth allocation requests for the PNC to communicate to the DEVs, for the DEVs to communicate to the PNC, and for the DEVs to communicate among themselves. Based on these bandwidth allocation requests, the PNC may dynamically allocate bandwidth to the DEVs in a real-time mode. Thus, the allocation may be made immediately instead of waiting until the occurrence of the next superframe. Alternatively and/or additionally, P-REQ and P-RSP frames may also carry the address of the DEVs to which bandwidth is to be dynamically allocated for the purpose of data communication.

After obtaining the bandwidth allocation requests from the DEV(s), the PNC may initiate GP 240 following the end of the PP 210. During the GP 240, the PNC may grant a dynamic BWA based on the set of bandwidth allocation requests it received in the preceding PP 210. The PNC may perform bandwidth grants 250 through the transmission of Polling Grant (P-GNT) frames 252, 254 and 256 to the transmitter and receiver(s) of DEV participating in the granted link. DEVs that may be granted a dynamic BWA by the PNC may then initiate communication 280 (between various transmitters and receivers) at the scheduled time indicated in the P-GNT frames 252, 254 and 256, if desired. Alternatively, in some embodiments of the invention, the PNC may initiate a GP 240 without even performing a PP preceding a GP, although the scope of the present invention is not limited to this example.

Figure 3:
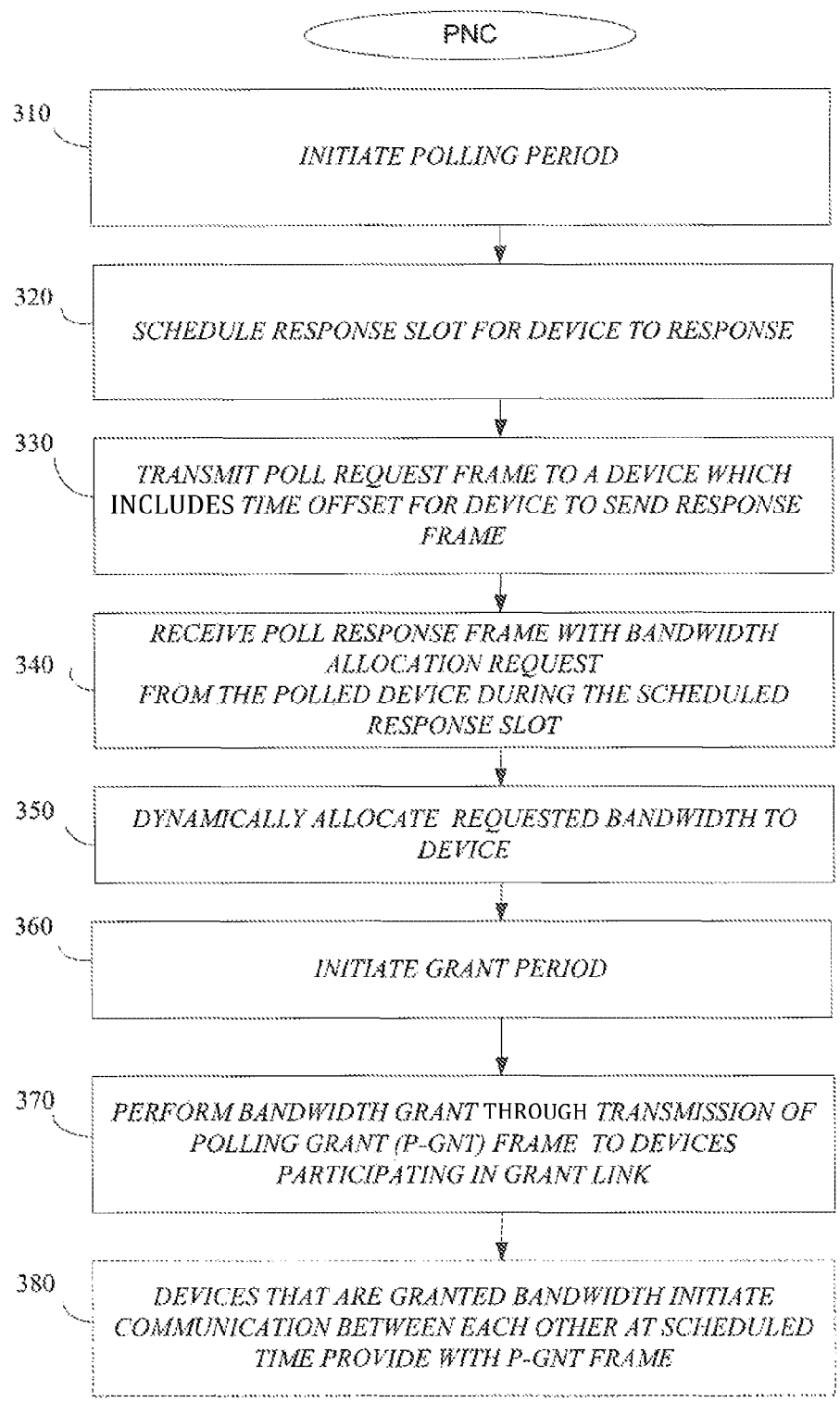
FIG. 3 is a flow chart of a method of bandwidth allocation by using a polling scheme, according to some embodiments of the invention.

Turning to FIG. 3 is a flow chart of a method of bandwidth allocation by using a polling scheme, according to some embodiments of the invention is shown. According to this exemplary embodiment of the invention, a PNC (e.g., PNC 120) may initiate a polling period with each one of the devices (e.g., DEVs 130, 140 and 150) participating in the WPAN (step 310). The PNC may schedule for each device a response slot to respond (step 320). The PNC may transmit a poll request to each device. For example, the poll request frame may include a time offset for the device to send a response frame, if desired (step 330).

Each DEV may transmit the response frame at an allocated time slot for each DEV to response according to the time offset received with the poll request frame. According to some embodiments of the invention, the poll request frame may include a bandwidth allocation request and DEV addresses. The PNC may receive the poll response frame with the bandwidth allocation request from the polled devices (step 340) and may dynamically allocated the requested bandwidth to the devices e.g., DEV1 130, DEV2 140, DEV3 150 (step 350).

Although the scope of the present invention is not limited to this exemplary embodiment of the invention, the PNC (e.g., PNC 120) may initiate a grant period (step 360). During the grant period (e.g., grant period 240), the PNC (e.g., PNC 120) may perform a bandwidth grant through transmissions of polling grant (P-GNT) frames to the devices participating in the grant link (step 370). The devices that granted the requested bandwidth may initiate communication between the devices at the scheduled time that provided with the P-GNT frame (step 380), although the scope of the present invention is not limited to this respect.

Figure 4:
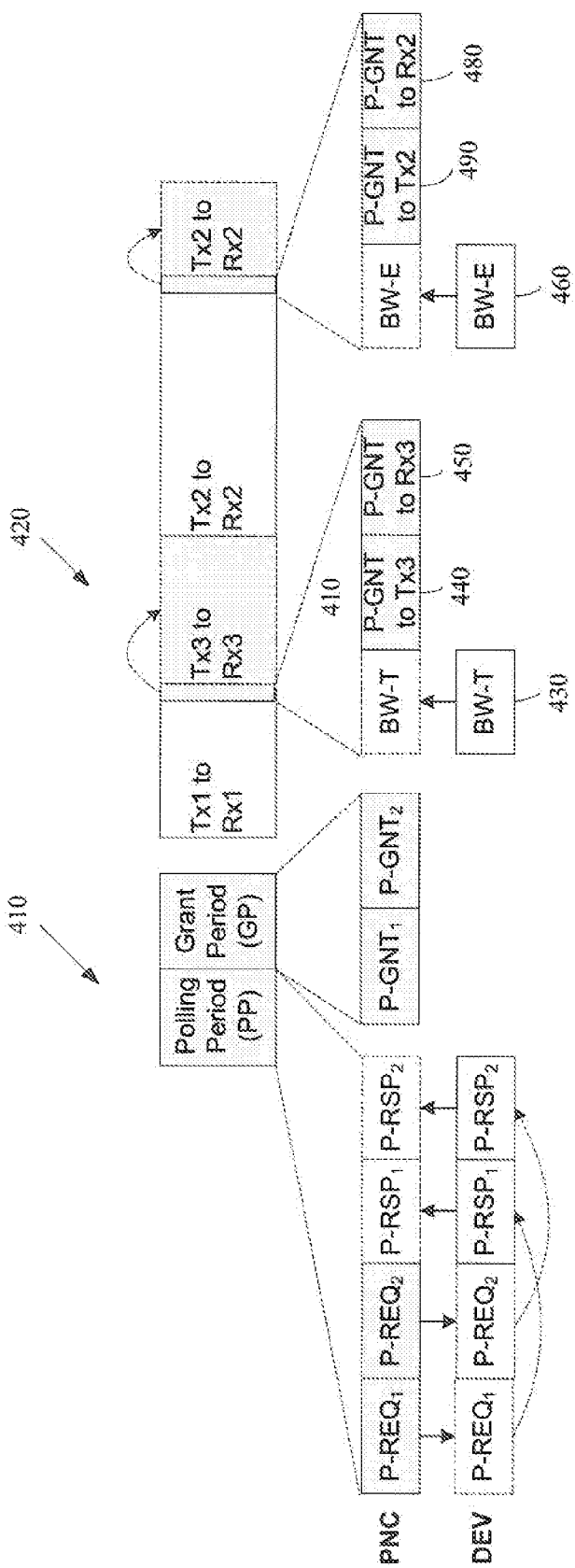
FIG. 4 is an illustration of a directional polling scheme and a bandwidth truncation and a bandwidth extension schemes of a wireless personal network according to some exemplary embodiment of the invention.

Turning to FIG. 4 a schematic illustration of a directional polling scheme and a bandwidth truncation and bandwidth extension schemes of a wireless personal network according to some exemplary embodiment of the invention is shown. The illustration includes two parts: the first part 410 illustrates a polling scheme according to some embodiments of the invention which is similar to the polling scheme which described by FIG. 2 and the method of FIG. 3. The second part 420 illustrates a polling-based bandwidth truncation and extension schemes.

According to one exemplary embodiment of the invention, the PNC may grant multiple reservations during the GP. Battery constrained DEVs may go into power save mode and wake up only when needed for their communication. Other DEVs may stay in the active mode to take advantage of dynamic bandwidth allocation (BWA) truncations and extension over the polling-based channel access scheme, if desire.

The BWA truncation may take place when a device which defined as a transmitter of a link decides to relinquish (i.e., truncate) the remainder of the current BWA it has (e.g., illustrated as Tx1). In this example, Tx1 may transmit a directional bandwidth truncation (BW-T) message 430 to the PNC requesting that the BWA be truncated. In response, the PNC may accept the request and may select to operate according to one of the following options. The first option may be to "do nothing" in which the PNC may allow the remaining time in the allocation to be unused. The second option may be to transmit P-REQ frames to other DEVs, with the goal of allocating the freed up channel time to another link. The third option may be to transmit the P-GNT messages 440 and 450 to DEVs (e.g., Tx3 and Rx3), respectfully, to allocate the freed up bandwidth for communication between these devices, although the scope of the present invention is not limited to this example.

According to some exemplary embodiments of the invention, a BWA extension is the opposite of BWA truncation. In BWA extension, a device defined as a transmitter of the link may desire to extend its current BWA due to traffic needs over the link (e.g., illustrated as Tx2). In the example shown in FIG. 4, Tx2 may transmit a directional BW-E (Bandwidth Extension) message 460 to the PNC requesting for that BWA to be extended for a pre-determined amount of time. In response, the PNC may operate as follows: 1) Reject the request. In this case, the BWA to the link bandwidth remains the same. 2) Grant the extension, in this case the DEVs participating in the link may be allowed to continue communication for the additional time granted by the PNC. The PNC may transmit P-GNT messages 480, 490 to DEVs Tx2 and Rx2, informing these DEVs of the additional time granted for communication, although the scope of the present invention is not limited in this respect.

Figure 5:
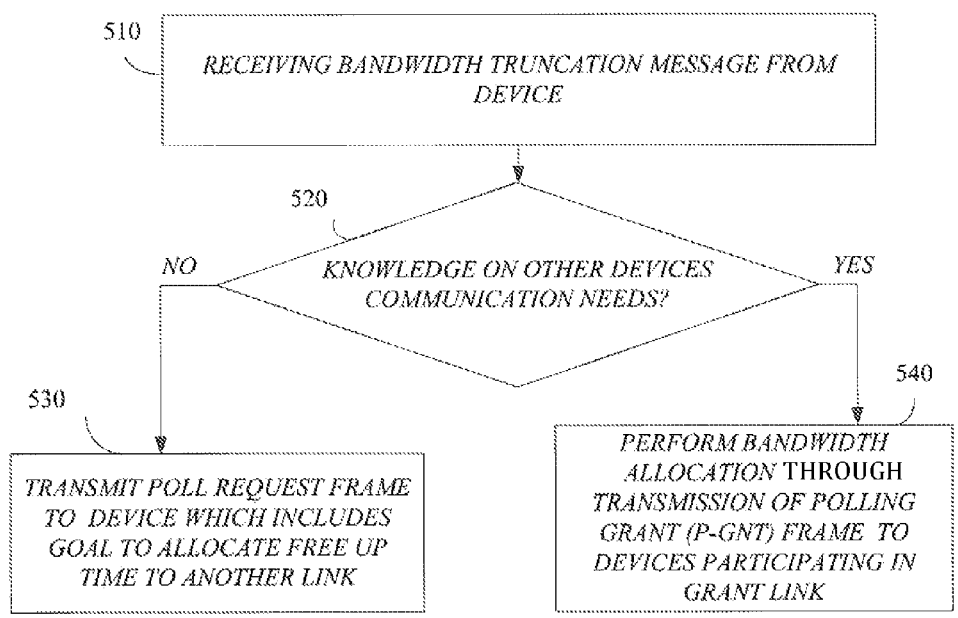
FIG. 5 is a flow chart of a method of a bandwidth extension, according to some embodiments of the invention.

Turning to FIG. 5, a flow chart of a method of a bandwidth truncation, according to some embodiments of the invention is shown. According to this example method, a PNC may receive a bandwidth truncation message from a device (step 510). If the PNC has knowledge of the communication needs of the devices e.g., allocated bandwidth, desired bandwidth (step 520), the PNC may perform bandwidth truncation through transmissions of polling grant (P-GNT) to each one of the devices participating in the grant link (text box 540). The PNC may have knowledge from the preceding PP with the DEVs. If the PNC does not have knowledge of the device's communication needs e.g., allocated bandwidth, desired bandwidth (step 520), the PNC may transmit a poll request frame to the device (step 530). For example, the poll request frame may include a goal to allocate a free up time to another link, if desired (step 530).

Figure 6:
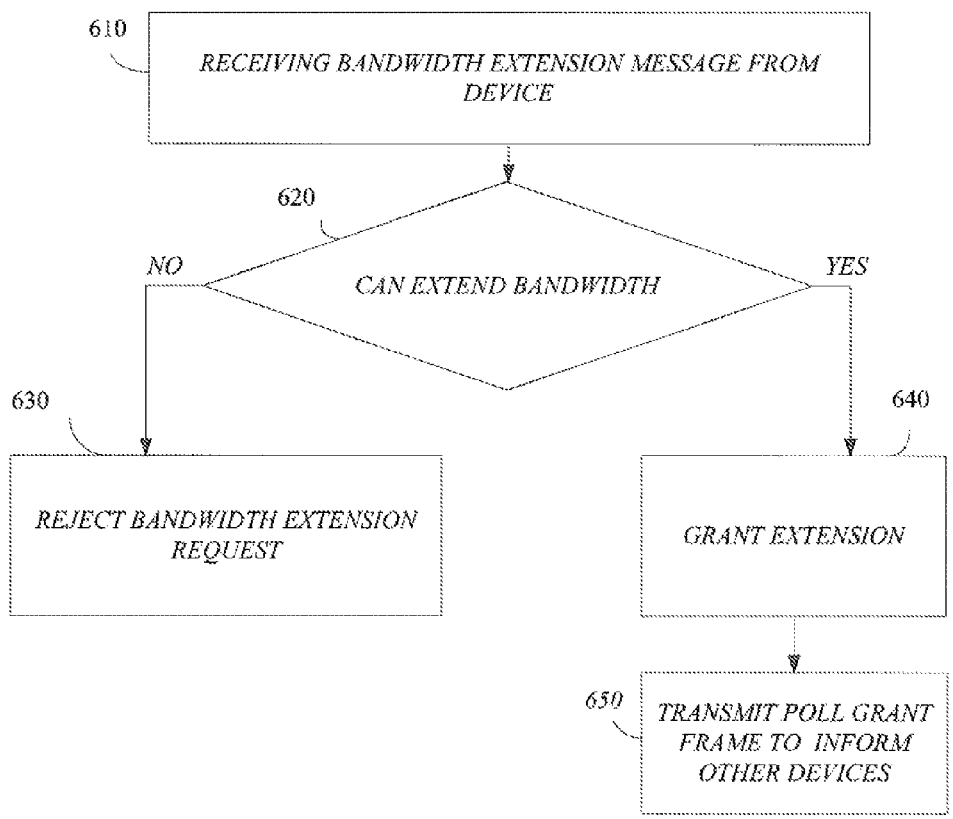
FIG. 6 is a flow chart of a method of a bandwidth extension, according to some embodiments of the invention.

Turning to FIG. 6 a flow chart of a method of a bandwidth extension, according to some embodiments of the invention is shown. According to this exemplary method, a PNC may receive a bandwidth extension method from a device (step 610). The PNC may check if the bandwidth may be extended (step 620). If the bandwidth may be extended the PNC may transmit a P-GNT frame to the device to grant the requested extension (step 640) and may transmit a poll grant frame to inform the other device of the link that a bandwidth extension has been granted (step 650). However, if the bandwidth may not be extended then the PNC may reject the bandwidth extension request (step 630), although the scope of the present invention is not limited to in this respect.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of communicating in a wireless communication network, comprising:
    transmitting, during a polling period, a first poll request frame addressed to a first device, wherein the first poll request frame includes a first time offset value for the first device to send a first poll response frame;
    transmitting, during the polling period, a second poll request frame addressed to a second device, wherein the second poll request frame includes a second time offset value for the second device to send a second poll response frame;
    receiving, during the polling period and at a time based on the first time offset value, the first poll response frame from the first device, the first poll response frame including a first time allocation request from the first device;
    receiving, during the polling period and at a time based on the second time offset value, the second poll response frame from the second device, the second poll response frame including a second time allocation request from the second device;
    transmitting, during a grant period subsequent to the polling period, a first grant frame to the first device granting a first scheduled period for communication by the first device based on the first time allocation request; and
    transmitting, during the grant period, a second grant frame to the second device granting a second scheduled period for communication by the second device based on the second time allocation request.

2. The method of claim 1, further comprising:
    receiving an extension message from said first device requesting an extension of said first scheduled period; and
    granting the request to extend the first scheduled period.

3. The method of claim 2, wherein said granting the request to extend the first scheduled period comprises transmitting a poll grant frame to advertise the service period extension.

4. A wireless communications device, comprising:
    a transmitter configured to:
        transmit, during a polling period, a first poll request frame addressed to a first device, wherein the first poll request frame includes a first time offset value for the first device to send a first poll response frame; and
        transmit, during the polling period, a second poll request frame addressed to a second device, wherein the second poll request frame includes a second time offset value for the second device to send a second poll response frame; and
    a receiver configured to:
        receive, during the polling period and at a time based on the first time offset value, the first poll response frame from the first device, the first poll response frame including a first time allocation request from the first device; and
        receive, during the polling period and at a time based on the second time offset value, the second poll response frame from the second device, the second poll response frame including a second time allocation request from the second device;
    wherein the transmitter is further configured to:
        transmit, during a grant period subsequent to the polling period, a first grant frame to the first device granting a first scheduled period for communication by the first device based on the first time allocation request; and
        transmit, during the grant period, a second grant frame to the second device granting a second scheduled period for communication by the second device based on the second time allocation request.

5. The wireless communications device of claim 4, wherein the receiver is further configured to receive an extension message from the first device requesting an extension of the first scheduled period, and
    wherein the transmitter is configured to grant the request to extend the first scheduled period.

6. The wireless communications device of claim 5, wherein said transmitter is to grant the request to extend the first scheduled period by transmitting a poll grant frame to advertise the service period extension.

* * * * *